TEST SPECIMEN #1

DATA

1/2 M COPPER TUBING
3 WROUGHT & 3 CAST COUPLINGS
66% COPPER
SHEAR: 370 LB/IN$^2$
LOAD: 8.7 LB.

TEST SPECIMEN #2

DATA

1/2 M COPPER TUBING
3 WROUGHT & 3 CAST COUPLINGS
66% COPPER
SHEAR: 570 LB/IN$^2$
LOAD: 14.6 LB.

INVENTORS:
BERTRAM C. RAYNES
MICHAEL PESCATRICE
BY Watts & Fisher, attys.

TEST SPECIMEN #3

DATA

1/2 M COPPER TUBING
3 WROUGHT & 3 CAST COUPLINGS
50 % COPPER
SHEAR: 370 LB/IN.$^2$
LOAD: 8.8 LB.

TEST SPECIMEN #4

DATA

1/2 M COPPER TUBING
3 WROUGHT & 3 CAST COUPLINGS
50% COPPER
SHEAR: 605 LB/IN.$^2$
LOAD: 16.0 LB.

INVENTORS:
BERTRAM C. RAYNES
MICHAEL PESCATRICE
BY *Watts & Fisher, attys.*

DATA

1/2 M COPPER TUBING
3 WROUGHT & 3 CAST COUPLINGS
34% COPPER
SHEAR: 370 LB./IN.$^2$
LOAD: 8.8

DATA

1/2 M COPPER TUBING
3 WROUGHT & 3 CAST COUPLINGS
34 % COPPER
SHEAR: 595 LB/IN.$^2$
LOAD: 15.6 LB

INVENTORS:
BERTRAM C. RAYNES
MICHAEL PESCATRICE
BY Watts & Fisher, attys.

DATA

1/2 M COPPER TUBING
3 WROUGHT & 3 CAST COUPLINGS
20% COPPER
SHEAR: 370 LB./IN$^2$
LOAD: 8.7 LB.

DATA

1/2 M COPPER TUBING
3 WROUGHT & 3 CAST COUPLINGS
20% COPPER
SHEAR: 605 LB/IN$^2$
LOAD: 16.0 LB.

United States Patent Office 3,418,179
Patented Dec. 24, 1968

3,418,179
MATERIALS FOR PRODUCING SOFT SOLDER JOINTS
Bertram C. Raynes, Pepper Pike, and Michael Pescatrice, Lakewood, Ohio, assignors, by mesne assignments, to Nibco Inc., Elkhart, Ind., a corporation of Indiana
Filed Nov. 22, 1965, Ser. No. 509,053
8 Claims. (Cl. 148—24)

ABSTRACT OF THE DISCLOSURE

In the art of forming soft solder sweat joints between copper parts, a mixture of a flux and discrete particles of a solid, solder-reinforcing agent which is inert to electrochemical action in a soft solder-copper system.

---

Figure 1:
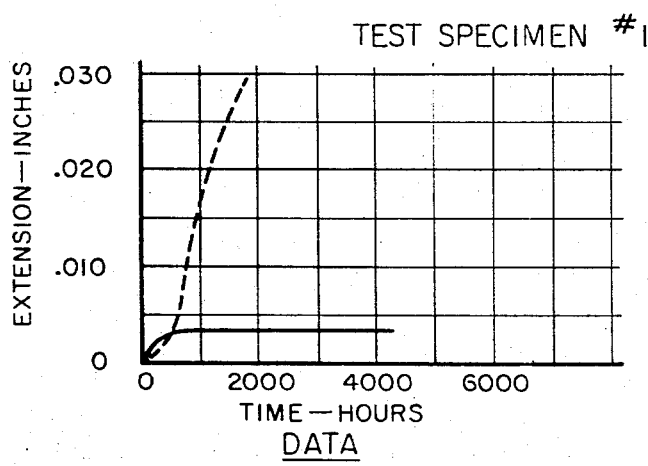

This invention relates generally to the soldering art, and more specifically to the formation of soft solder joints. It is particularly concerned with sweat joints connecting copper fittings and tubing such as those found in plumbing systems, and with methods and materials for forming such sweat joints.

The resistance of a soft solder joint to substantially constant or static forces as distinguished from transient forces, is known as "creep strength." Because of its poor creep strength which may be less than one-eighteenth of the short term loading of the joint, the soft solder sweat joint is the weakest part of the present copper plumbing systems. This weakness in soft solder sweat joints results primarily from the low strength of current solder materials. It is believed this weakness is also due to defects in the form of voids which occur in the solder space.

Prior efforts have had little success in either increasing the strength of solder materials and joints or improving their solderability to decrease the occurrence of joint defects. Instead, copper plumbing systems, as they are now generally assembled and constituted, are over designed structurally, particularly in the length of the solder cup, in an effort to assure adequate all-over joint strength. Some idea of this over design may be had by noting that the 50/50 soft solder sweat joint creep load for one-half inch size plumbing is on the order of one hundred pounds in hot water service, while the screep load for the copper tube and fittings themselves is on the order of three thousand pounds or more, a factor of thirty or greater. The factor is greater still for larger size plumbing.

In spite of the overdesign of the solder cup to provide greater total strength in the joints, the unit creep strength afforded by the present solder materials is so low that the conventional soft solder joint operates at a calculated safety factor level of 2.8 which is one of the lowest in building construction. If the long term joint strength in conventional systems were to have a safety factor equivalent to that in the rest of the system, the length of the solder cup would have to be several times its present length.

The actual creep strength of sweat joints formed by conventional materials and techniques is often less than the calculated or rated strength because of voids occuring in the solder space. Such defects are found in systems installed by expert plumbers and are quite common in joints made by relatively unskilled persons. The mechanisms responsible for defect formations are numerous, but it has been discovered that poor surface wetting and rate of spreading of the solder and a capillary driving force which is insufficient completely to expel the flux from the joint and promote a complete fill are prominent factors.

It will be apparent from the foregoing that important advantages can be obtained by increasing the creep strength of a soft solder sweat joint. An improvement in the unit creep strength would improve the entire general strength of sweat plumbing systems. Concomitantly, it would be posible to eliminate much of the conventional over design by decreasing the solder cup length, as well as lightening other components including the tubing, and thereby provide for substantial cost reductions. An improvement in the joint strength would also afford increased reliability and safety factor and reduce the occurence of service failures.

Known prior art joints, such as brazed joints, exist which have substantially greater creep strength than soft solder joints. These joints require higher forming temperatures than do soft solder joints. This is a factor that may make brazed joints undesirable, especially in frame constructions where high temperatures may be dangerous. Thus, in spite of its poor creep strength, the soft solder joint is preferred and used because of ease of installation, its low temperature melting, and also because of its good capillary flow characteristics at low temperatures.

The copending application of Theodore D. Jaynes for Soft Solder Joints, Ser. No. 509,070, filed Nov. 22, 1965 and assigned to the same assignee as the present application, discloses basic discoveries which have made it possible to obtain copper sweat joints having unexpectedly high strength and to improve the overall strength of copper plumbing systems. In general, the inventions described in that application contemplate the introduction of a strengthening agent into the joint in order to improve the strength properties of the solder layer. The strengthening agent is preferably in the form of discrete particles which are unalloyed with the solder and are distributed throughout the joint. Several ways were disclosed for introducing the particles into the joint, including the electrodeposition of copper particles in the fitting, preplacing a quantity of particles in the fitting with a paste flux, and mixing or blending the particles in a suitable flux which is then applied in the usual manner to at least one of the parts to be joined.

The present invention is a novel advancement of the foregoing inventions disclosed in copending application Ser. No. 509,070. The invention resides in the discovery that, in addition to affecting a marked increase in the strength of soft solder materials, it is possible to improve the solderability of sweat joints and substantially reduce or eliminate the occurrence of voids in the solder layer by controlling the size and amount of the dispersion strengthening agent.

In carrying out the invention, the dispersion strengthening agent is preferably introduced into the solder joint by a flux vehicle. This may be accomplished by mixing or blending particles of the strengthening agent in a suitable flux, such as a commercially available corrosive paste flux, which is applied to the parts to be joined in the usual way. Alternate techniques for introducing the dispersion strengthening agent are set forth below. Copper powders have proved especially effective as the strengthening agent, although it is contemplated that materials such as glass or the like which will not cause electrochemical corrosion of a solder-copper system could be used.

The novel copper-flux material which comprises one aspect of the invention has several important advantages. As much as 80% by weight of copper can be introduced into a paste flux and the flux wiped onto a fitting in a manner similar to conventional flux. The major portions of the powder remains in the joint to strengthen the subsequently applied solder; however, as distinguished from prior attempts which have been made to add a strengthening agent directly to the solder, the application of the preferred copper powder in a flux vehicle does not adversely effect the flow characteristics of the solder and the times the temperatures of the soldering operation. The invention therefore provides a new flux material and soldering technique which result in greatly improved strength characteristics of the formed joint and yet do not require significant modification of standard soldering practices. Thus, the methods and materials of the invention can be used without special handling by both skilled and unskilled persons to form improved copper sweat joints.

It has been discovered that the optimum minimum amount of the dispersion strengthening agent should be on the order of about 20% by weight in the flux and that the minimum particle size distribution should be about 85% or less minus 325 mesh. Examination of sweat joints made by use of a flux compound containing from about 20% to about 80% by weight of copper powder having a particle size distribution of 85% or less minus 325 mesh indicate fewer microscopically visible voids and imperfections than in joints made according to other procedures. Large voids are almost eliminated. While the mechanism responsible for the substantial reduction of voids in the solder space is not clearly understood, it is believed that one prominent factor is an increase in the capillary force or dynamic action of the molten solder. This belief is based on observations that the solder meniscus advances evenly through the joints in such a manner as to almost completely expel flux sludges and avoid entrapment of flux and gas. Thus, the use of distributed copper particles promotes a complete fill of the joint by the molten solder and results in a larger solder area than in conventional sweat joints of the same size. The increased solder area is another reason for the greatly improved strength of joints made in accordance with this invention.

Among other advantages are that the new copper-flux can be used without changing the design of the usual plumbing fittings. The new flux material of this invention is relatively inexpensive and does not require special equipment, know-how or materials to produce. Further, it is characterized by a long shelf life and can be stored prior to use without deterioration.

Accordingly, the objects of the invention are to provide sweat joints of improved strength and methods and materials for making such joints. A more specific object of the invention is to provide for the use of a dispersion strengthening agent in an amount and size which has been found effective to increase the strength of the solder materials and to substantially reduce or eliminate the occurrence of voids in the solder layer.

Other features, objects, advantages and a fuller understanding of the invention will be apparent from the following detailed description and the accompanying drawings.

Figure 2:
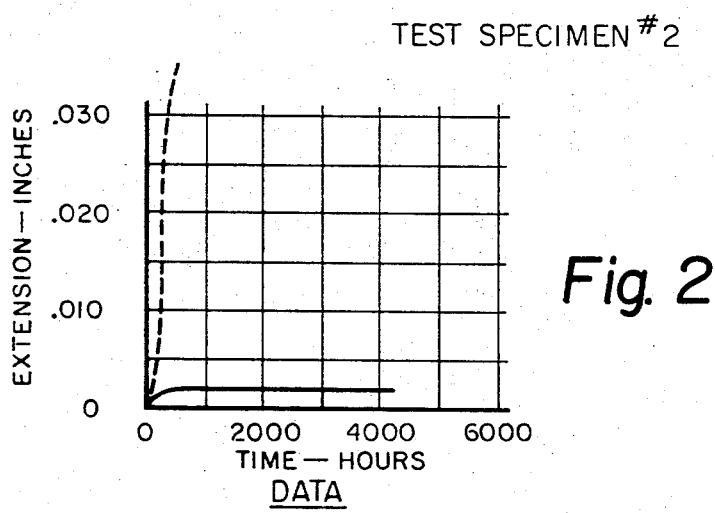
Figure 3:
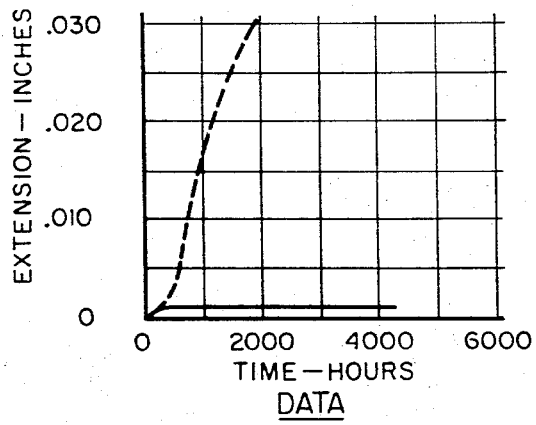
Figure 4:
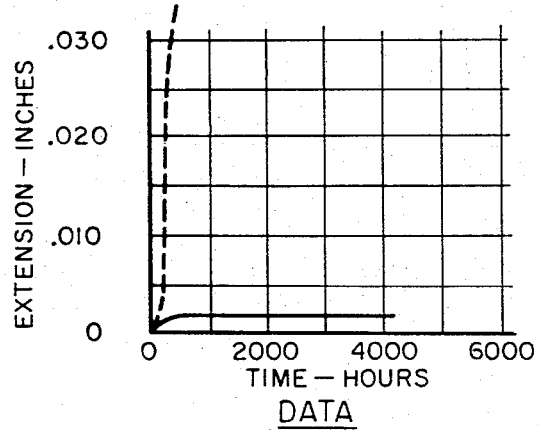
Figure 5:
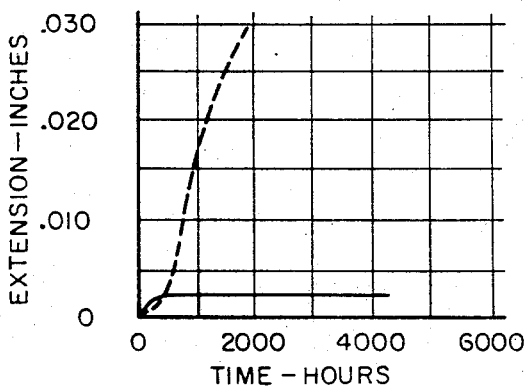
Figure 6:
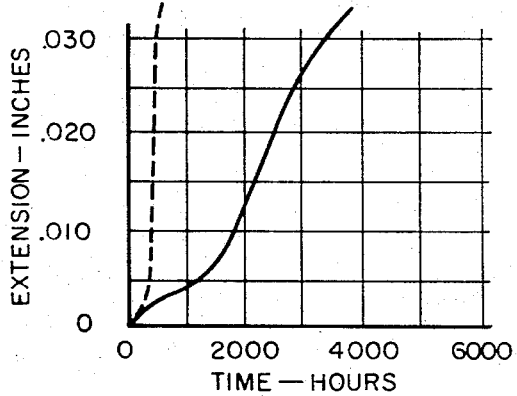
Figure 7:
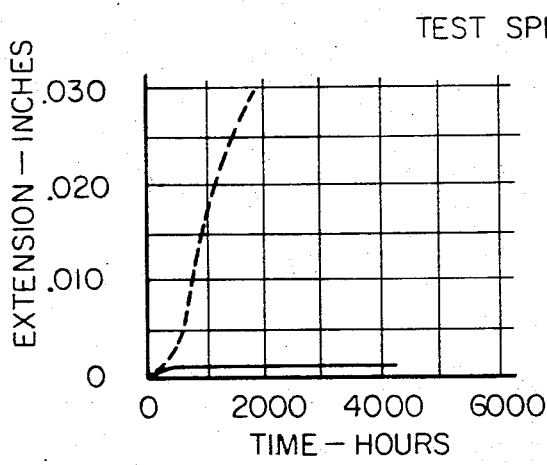
Figure 8:
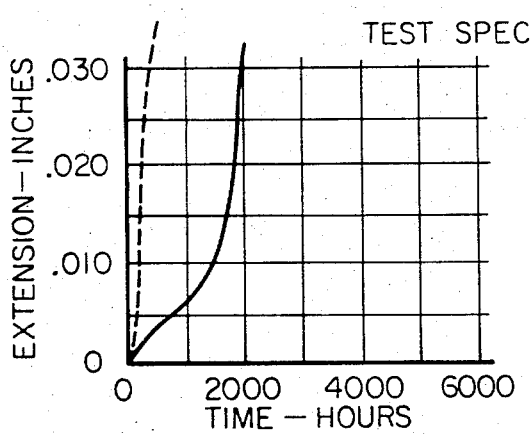

In the drawings, FIGURES 1 through 8 are graphs showing creep strength data of joints formed in accordance with the invention compared to creep strength data of conventional copper sweat joints.

As generally described above, the invention is concerned with the formation of soft solder joint by use of a strengthening agent which is in a form that is effective to increase the strength of the solder material and to reduce the occurrence of voids in the solder layer. The invention also pertains to methods and materials for introducing the strengthening agent into the joint. In the preferred embodiments to be descirbed, the strengthening agent is in the form of discrete particles which are added to the flux and the flux is applied to the metal parts in a manner similar to standard practice.

The primary matters of concern in carrying out the preferred concepts of the invention are the particular material selected as the strengthening agent, the particle size, and the amount of particles added to the flux. The specific composition of the flux itself is not of significant importance and various commercial fluxes can be selected depending upon the particular soldering application. Similarly, the soft solder which is used can be any conventional type.

In the specific examples set forth below, a conventional corrosive paste flux sold under the trade name Oatey No. 5 by the L. R. Oatey Co., Cleveland, Ohio was used as the vehicle for introducing the particles into the sweat joints. The soft solder used in forming the joints was a standard 50/50 tin-lead solder. These materials were selected simply because they are presently widely used in copper plumbing systems, and it is to be understood that the exemplary flux and solder are not limiting of the invention.

A primary requirement of any commercially acceptable technique and material for reinforcing copper sweat joints is to avoid altering the basic solder-copper system by introducing a new metal atom that might result in electrochemical corrosion. Because of this consideration, commerically pure copper particles, are a preferred strengthening agent, although it is contemplated that alloys containing copper could be used. Electrolytic copper powders which have a low percentage of alloying elements and may be considered commercially pure are particularly well suited for the purposes of the present invention. While copper is disclosed as a preferred strengthening material it is contemplated that inert materials, such as glass particles or the like, which will not induce corrosion or other detrimental actions in the joint could be used.

As noted above, another consideration in the formation of reinforced, void-free soft solder joints is the particle size of the strengthening agent. In forming sweat joints, the maximum particle size is determined by clearance of the fitting. The average total clearance of most fitting designs is approximately 0.006 inch, and in such designs it is preferred that the maximum particle size be 0.003 inch (100% minus 200 mesh). Particles having a maximum size of 0.003 inch can be distributed around the end of the tube or the inside of the solder cup and the two members maintained in concentricity in accordance with good soldering practice.

In accordance with this invention, it has been determined that the minimum particle size distribution should be on the order of 85% or less minus 325 mesh. The most preferred powders which have been used successfully in the flux combinations have a maximum particle size of approximately .003 inch (100% minus 200 mesh) and a minimum particle size distribution in the range of from about 50% to about 81% minus 325 mesh with the average minimum particle size being about 44 microns. Extremely finely divided powders, e.g. 100% minus 400 mesh, may have some strengthening effect. However, it has been observed that joints formed with such powders exhibit voids in the solder layer similar to conventional joints.

There are several commercially availabe copper powders which satisfy the foregoing parameter of particle size and can be used in accordance with the invention. The following are three typical electrolytic copper powders which have been used successfully:

(1) AMAX Type B electrolytic copper powder (American Metal Climax, Inc.) 99.5% min. Cu, apparent density 2.5–2.6 gm./cc.—

| Screen analysis (mesh): | Percent |
|---|---|
| 100, max. | 0.2 |
| 150 | 1–11 |
| 200 | 13–23 |
| 250 | 3–10 |
| 325 | 17–27 |
| Minus 325 | 45–53 |

(2) MD 201 granular copper power (Metals Disintegrating Corp.) 99.0% Cu, apparent density 2.4–2.8 gm./cc.

| Screen analysis (mesh): | Percent |
|---|---|
| Minus 200 | 100 |
| Minus 325 | 85 |

(3) Screened electrolytic copper powder.

| Screen analysis (mesh): | Percent |
|---|---|
| 100 | 0.0 |
| 150 | 1.1 |
| 200 | 12.7 |
| 250 | 9.5 |
| 325 | 19.8 |
| Minus 325 | 55.5+ |

Another parameter of the preferred copper-flux is the amount of copper powder which is used. The preferred range of the copper powder or other strengthening agent in the flux is from about 20% by weight to about 80% by weight. While lesser amounts of copper powder may have some strengthening effect on the solder, it has been found that when the powder is below about 20% by weight in the flux the joints usually exhibit imperfections in the form of voids and are not visually different from unreinforced joints. Amounts of copper in excess of 80% also may provide improvements in the strength of the joints, but in such instances it is difficult to wipe the copper-flux onto a fitting and the stiff flux may be stripped off when the tube is assembled in the cup.

Copper powder in the amounts indicated can be readily mixed or blended into the flux without requiring any special handling techniques or equipment. As noted above, the resulting composition has a long shelf life and can be stored for a year or more before use.

In use the copper-flux can be applied in nearly the same manner as conventional fluxes, although it has been observed that paste fluxes containing large amounts of the powder apply somewhat more stiffly than the usual paste flux. The subsequently introduced soft solder is readily accepted into the joint and the finished joint will have an exterior appearance to that of an ordinary one. The soft solder may be placed in the joint in accordance with conventional practices, such as melting the solder by bringing it into contact with a surface heated to the soldering temperature, allowing the molten solder to flow into and fill the joint space, and then cooling the metal surfaces. The invention also can be practiced in conjunction with the constructions and methods disclosed in copending applications Ser. No. 429,562, now Patent No. 3,334,925, filed Feb. 1, 1965 and entitled Sweat Soldering Apparatus, and Ser. No. 462,673, filed June 9, 1965 and entitled Sweat Soldering Invention.

Accelerated screening creep tests of copper sweat joints formed by using the above-described copper-flux and method have shown a large improvement in the strength of the reinforced solder layer. As previously discussed, this improvement is due in part to an increase in the unit creep strength of the reinforced solder and also to the substantial elimination of voids in the solder space. In one such accelerated test, a test section of ½ inch wrought coupling joints placed under a load of 1000 pounds per square inch shear and containing three conventional joints in which the solder was reinforced by a copper-flux containing 66% by weight of the copper indicated a minimum improvement in strength of a factor of 7:1. The maximum strength improvement has not been determined, since this test is still in progress at the time of this writing. All three of the conventionally soldered joints failed at the end of 292 test hours, the first having failed after only 101 hours. One of the copper-flux coupling joints failed after 725 hours, but all of the remaining reinforced coupling joints have withstood over 3000 test hours.

Another accelerated test produced results similar to that set forth above. In this test, a ½ inch wrought fitting was made using 66% by weight copper-flux. A shear load of 600 pounds per square inch was applied to the fitting and the test is still in progress with no signs of failure after over 4000 hours. A similar load on a conventional 50/50 tin lead solder joint failed at the end of 1500 hours.

Extensive long term creep tests have also been conducted to show the improved creep strength of copper reinforced sweat joints under long term static shear loading. The test procedures which have been followed are similar to those described in the Building Materials and Structures (BMS) Report No. 58 by Swanger and Maupin, published Dec. 20, 1940 by the National Bureau of Standards. For the most part, higher loads were chosen than by Swanger and Maupin because of the increased strength of the copper-flux joints and the desired to reduce the total test time.

The following table summarizes the long term test results of several examples of copper-flux joints made in accordance with this invention. In each of these examples, the copper powders were mixed in an Oatey No. 5 corrosive paste flux referred to above. The copper powder was the previously described AMAX Type B electrolytic copper powder sold by American Metal Climax, Inc. in which all powder larger than minus 200 mesh (.003 inch) was screened out.

TABLE I

| Example Number | Fitting Size, inch | Copper, Percent | Shear Load in Pounds per Square Inch | Number Failures | Cumulative Hours |
|---|---|---|---|---|---|
| 1 | ½ | 66 | 370 | 0 | 3,655 |
| 2 | ½ | 66 | 570 | 0 | 3,655 |
| 3 | ½ | 50 | 370 | 0 | 3,655 |
| 4 | ½ | 50 | 605 | 0 | 3,672 |
| 5 | ½ | 34 | 370 | 0 | 3,672 |
| 6 | ½ | 34 | 595 | 11 | 3,672 |
| 7 | ½ | 20 | 370 | 0 | 3,672 |
| 8 | ½ | 20 | 605 | 12 | 1,922 |

Referring to the drawings, FIGURES 1–8 show plotted data for each individual example listed above in the table in comparison with plotted data for each individual example listed above in the table in comparison with plotted data calculated from the results of Swanger and Maupin. The solid lines in FIGURES 1–8 indicate the test results on the examples of the invention, while the dotted lines are based on the Swanger and Maupin data and indicate the average expected creep data for the test shear load or estimated data in the case of heavier loads.

The following Table II reports the results of modified short term tensile tests of conventional copper sweat joints and reinforced copper sweat joints made in accordance with this invention. By way of explaining the test procedures, it should be noted that ordinary tensile testing by standard rates of applied stresses does not reveal much about the strength of soldered joints. This is because the tube will fail under short term loads before the joint does unless there are extraordinary flaws in the joint. If a solid bar is substituted for the tubing, the fitting will frequently shear. Consequently, in conducting short term tensile tests, the procedure was to reduce the solder area of standard fittings by cutting down the cup length until the joints failed in the solder area. Joints of the same size were then made using the new copper flux and it was found that the average increase in reinforcement was from 10% to 15%.

AVERAGE TENSILE

| Cut-Down Cup Length, inch | Flux Only, p.s.i. | Cu-Flux Reinforced (66% Cu, 34% Flux) p.s.i. | Percent Increase |
|---|---|---|---|
| ⅜ | 3,140 | 3,500 | +11 |
| ¼ | 2,480 | 2,780 | +12 |
| ⅛ | 1,570 | 1,800 | +15 |

It will be seen from the above that the strength improvement in the ordinary copper sweat joints is substantial, and that this improvement can be obtained in a practical and easily accomplished manner by applying a flux containing the reinforcing agent to the parts to be joined and then introducing a molten soft solder in the usual way. The preferred flux which is used may be described broadly as flux vehicle containing from about 20% to about 80% by weight of the reinforcing particles, which are preferably in the form of a copper powder, having a minimum particle size distribution of about 85% or less minus 325 mesh and a maximum particle size which does not exceed one-half of the total clearance of the fitting design.

The finished joints may be broadly described as being characterized by a dispersion throughout the solder layer of free particles, preferably copper powder, having a minimum particle size distribution of about 85% or less minus 325 mesh. While the preferred technique of introducing the powder in the joints is by use of the novel flux, it is to be understood that copper particles of the specified size can be electrodeposited in the fitting. It is also contemplated that copper powder or other strengthening material can be preplaced in the cup or fitting with a paste flux.

As used herein, the term "free" in referring to the dispersion strengthening agent is intended to mean that the agent is to substantially unalloyed in the solder layer. The term "copper" is used in the specification and claims in a broad sense and includes commercially pure copper as well as metals and alloys containing copper.

Many modifications and variations of the invention will be apparent to those skilled in the art in view of the foregoing detailed disclosure. Therefore, it is to be understood that, within the scope of the appended claims, the invention can be practiced otherwise than as specifically shown and described.

What is claimed is:

1. A composition of matter adapted for use in forming a soft solder sweat joint between copper parts, said composition of matter consisting essentially of a mixture of a paste flux and discrete particles of a solid, solder-reinforcing material which is inert to electrochemical action in a soft solder-copper system, said reinforcing material being present in an amount of from 20% to 80% by weight and having a minimum size of 85% or less minus 325 mesh.

2. The composition of matter as claimed in claim 1 in which the reinforcing material consists of copper powder.

3. A composition of matter adapted for use in forming a soft solder sweat joint between copper parts, said composition of matter consisting essentially of a mixture of a paste flux and discrete particles of a solid, solder-reinforcing material which is inert to electrochemical action in a soft solder-copper system, said reinforcing material being present in an amount of from 20% to 80% by weight and having a particle size of 100% minus 200 mesh and an average minimum particle size of approximately 44 microns.

4. A composition of matter as claimed in claim 3 in which the reinforcing material consists of copper powder.

5. A composition of matter adapted for use in forming a soft solder joint between copper parts, said composition of matter consisting essentially of a mixture of a paste flux and from about 20% to about 80% by weight copper particles.

6. The composition of matter as claimed in claim 5 wherein said copper particles are a commercially pure, electrolytic copper powder.

7. The composition of matter as claimed in claim 5 wherein the copper particles have a minimum size in the range of from about 50% to about 81% minus 325 mesh.

8. The composition of matter as claimed in claim 7 wherein the copper particles have a size of 100% minus 200 mesh.

References Cited

UNITED STATES PATENTS

| | | | |
|---|---|---|---|
| 893,207 | 7/1908 | Tabet | 29—496 |
| 1,722,025 | 7/1929 | Wagener | 29—495 |
| 1,966,260 | 7/1934 | Munson | 29—496 |

L. DEWAYNE RUTLEDGE, *Primary Examiner.*

W. W. STALLARD, *Assistant Examiner.*

U.S. Cl. X.R.

29—496